United States Patent
Baron et al.

(10) Patent No.: US 10,495,506 B2
(45) Date of Patent: Dec. 3, 2019

(54) LIQUID LEVEL METER

(71) Applicant: Baron Brew Equipment, LLC, Santa Rosa, CA (US)

(72) Inventors: Noah Ananda Baron, Santa Rosa, CA (US); Tyler Michelson Bryant, Santa Rosa, CA (US)

(73) Assignee: Baron Brew Equipment, Santa Rosa, CA (US)

(*) Notice: Subject to any disclaimer, the term of this patent is extended or adjusted under 35 U.S.C. 154(b) by 272 days.

(21) Appl. No.: 15/706,736

(22) Filed: Sep. 17, 2017

(65) Prior Publication Data

US 2018/0195891 A1    Jul. 12, 2018

Related U.S. Application Data

(60) Provisional application No. 62/444,805, filed on Jan. 11, 2017.

(51) Int. Cl.
*G01F 23/30* (2006.01)
*G01F 23/44* (2006.01)

(52) U.S. Cl.
CPC ............ *G01F 23/303* (2013.01); *G01F 23/44* (2013.01)

(58) Field of Classification Search
CPC .... G01F 23/0076; G01F 23/30; G01F 23/303; G01F 23/56; G01F 23/60; G01F 23/64; G01F 23/68; G01F 23/76

USPC ................................ 73/305, 309, 313, 322.5
See application file for complete search history.

(56) References Cited

U.S. PATENT DOCUMENTS

| | | | |
|---|---|---|---|
| 5,655,403 A | 8/1997 | Topliff | |
| 5,767,775 A * | 6/1998 | Shukla | B01F 13/0818 200/220 |
| 6,422,746 B1 | 7/2002 | Weiss et al. | |
| 9,234,828 B2 | 1/2016 | Baron et al. | |
| 2007/0028688 A1 | 2/2007 | Balogh | |
| 2007/0221233 A1 | 9/2007 | Kawano et al. | |
| 2009/0281686 A1 | 11/2009 | Smith et al. | |
| 2011/0053283 A1 | 3/2011 | Hood et al. | |
| 2014/0260607 A1 * | 9/2014 | Baron | G01N 9/16 73/448 |

* cited by examiner

*Primary Examiner* — Benjamin R Schmitt
(74) *Attorney, Agent, or Firm* — Brian R. Short

(57) ABSTRACT

In one embodiment, an apparatus may meter a level of a liquid. The apparatus includes a float component, wherein the float component includes a sensor and a controller. The sensor senses a parameter usable to determine an inclination of the float component. The controller is operable to receive the sensed parameter, and communicate information based on the sensed parameter to an external controller. When operating to determine a level of a liquid within a container, the apparatus physically contacts the container. Further, at least one of the controller or the external controller is operative to estimate the inclination of the float component based on the sensed parameter, and determine the level of the liquid within the container based on the estimated inclination.

14 Claims, 5 Drawing Sheets

Sensing a parameter, by a sensor of a float component of an apparatus, wherein the sensed parameter is usable to determine an inclination of the float component

510

▼

Receiving, by a controller of the float component, the sensed parameter

520

▼

Estimating the inclination of the float component based on the sensed parameter

530

▼

Determining the level of the liquid within the container based on the estimated inclination, wherein when operating to determine a level of a liquid within a container, the apparatus physically contacts the container

LIQUID LEVEL METER

RELATED APPLICATIONS

This patent application claims priority to U.S. Provisional Patent Application No. 62/444,805 filed on Jan. 11, 2017, which is herein incorporated by reference.

FIELD OF THE DESCRIBED EMBODIMENTS

The described embodiments relate generally to liquid monitoring. More specifically, the described embodiments relate to apparatuses and methods for monitoring a level of a liquid within a container.

BACKGROUND

For purposes of inventory and resupply it is important to know how much is remaining of any consumable material. Opaque containers for liquid materials, such as those made out of metal, do not allow easy assessment of the amount of liquid remaining in a container. Various solutions exist, such as sight glasses and scales, however all have drawbacks that might be acceptable in some use cases, but not in others. Existing level meters cannot be easily installed into a pre-existing container. Further, existing level sensors are costly, take up space, and are time consuming to configure.

For example, installing a sight glass on some containers is not practical. Other devices that do not require a specialized container require an external apparatus, for example a scale that may interfere with the storage of such container. In addition a scale requires a level ground and additional space when storage space may be limited.

It is desirable to have apparatuses, methods, and systems for monitoring a level of a liquid within a container that simple and easy to use.

SUMMARY

One embodiment includes an apparatus. The apparatus includes a float component, wherein the float component includes a sensor and a controller. The sensor senses a parameter usable to determine an inclination of the float component. The controller is operable to receive the sensed parameter, and communicate information based on the sensed parameter to an external controller. When operating to determine a level of a liquid within a container, the apparatus physically contacts the container. Further, at least one of the controller or the external controller is operative to estimate the inclination of the float component based on the sensed parameter, and determine the level of the liquid within the container based on the estimated inclination.

Another embodiment includes a method. The method includes sensing a parameter, by a sensor of a float component of an apparatus, wherein the sensed parameter is usable to determine an inclination of the float component, receiving, by a controller of the float component, the sensed parameter, estimating the inclination of the float component based on the sensed parameter, and determining the level of the liquid within the container based on the estimated inclination.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 is a flow chart that includes the steps of an example of monitoring a level of a liquid within a container, according to an embodiment.

DETAILED DESCRIPTION OF INVENTION

The described embodiments include systems, methods, and apparatuses for monitoring a level of a liquid within a container. At least some embodiments operate by dropping one of the described embodiments into a container of interest.

At least some embodiments are adapted for measuring a liquid level within a beer keg, wherein the container is metal and it is important to know how much of the liquid remains. However, the benefits of the described embodiments can be realized for the entire supply chain, from retailer to manufacturer.

At least some embodiments include transmitting a wireless signal that includes liquid level information to widely available smart phones and other devices, which allows the user to quickly assess volume of remaining liquid without touching the container. The container only needs to have at least one of the described embodiments floating inside of the container.

Figure 1:
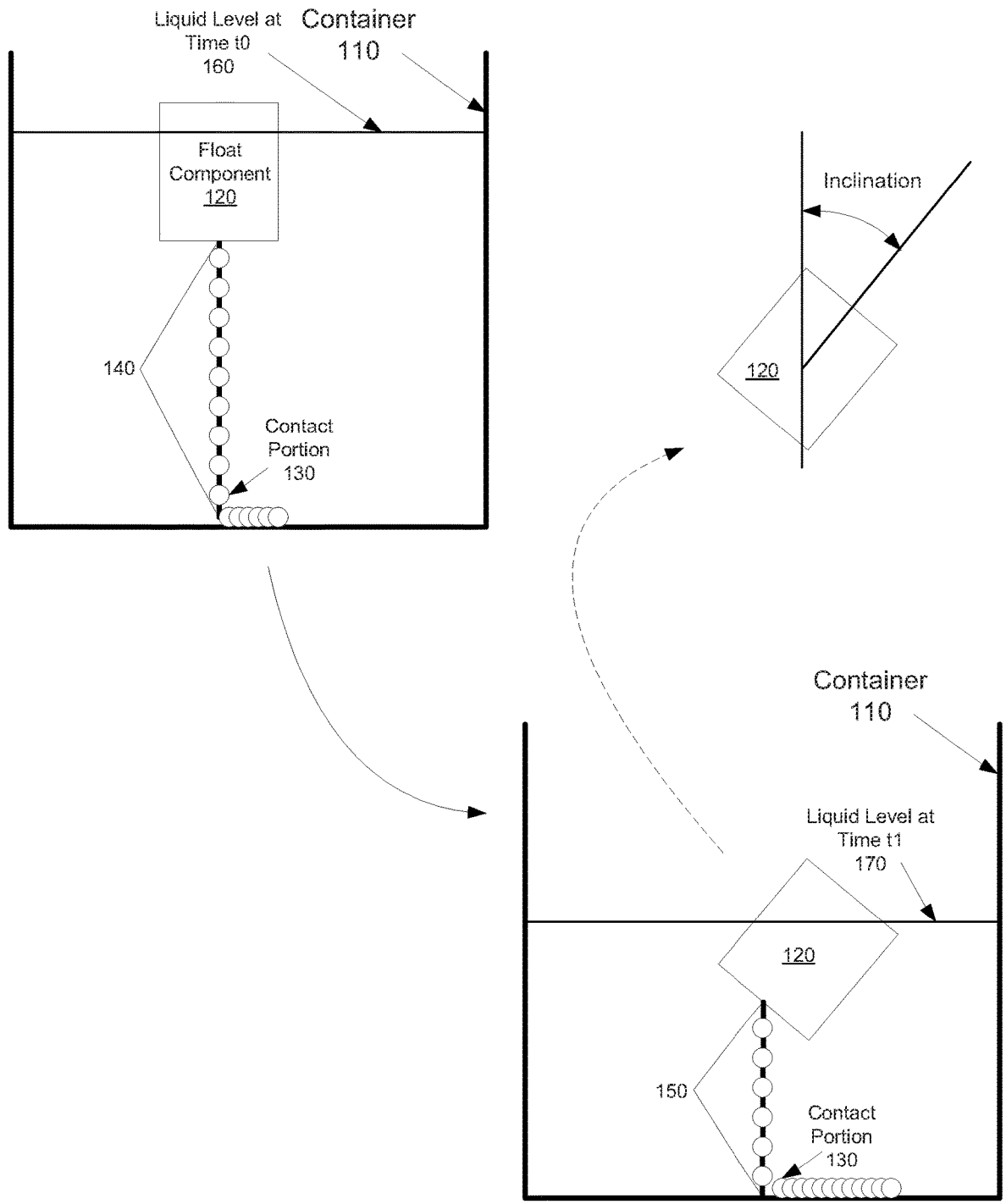
FIG. 1 shows a liquid level monitoring apparatus, according to an embodiment.

FIG. 1 shows a liquid level monitoring apparatus, according to an embodiment. As shown in FIG. 1, a level of a liquid in a container 110 changes from a first level 160 at time t0 to a second level 170 at time t1. For an embodiment, the level of the liquid is determined based on an inclination of a float component 120, wherein the float component 120 is located within the liquid within the container 110.

For at least some embodiments, the float component 120 includes a sensor that is useable for determining the inclination of the float component 120. Based on the inclination of the float component 120, the level of the liquid of the container can be estimated. For example, if at t0 the level of the liquid is determined to be 15 gallons, the liquid level at t1 can be estimated based on the difference between the inclination of the float component at t0 and the inclination of the float component at t1. That is, the change in the inclination of the float component from t0 to t1 can be used to estimate the change in the level of the liquid.

For at least some embodiments, the center of gravity and the center of buoyancy of the float component 120 are not coincident. As a result, the float component 120 naturally tilts. However, at least some embodiments include a contact portion 130 that for at least some embodiments provides a downward force on the float component 120 that works against the natural force of the float component 120 to tilt.

As shown in FIG. 1, at time t0 the mass (weight) of the portion 140 of contact portion 130 located between the float component 120 and the container 110 is great enough to reduce the amount of tilt (inclination) of the float component 120. However, as the level of the liquid decreases, the portion 150 of the contact portion between the float component 120 and the container 110 decreases, and therefore, the mass (weight) of the portion 150 decreases, and therefore, the tilt (inclination) of the float component increases. The change in the inclination can be used to estimate the change in the level of the liquid 160 at t0 and the level of the liquid 170 at t1. By knowing the dimensions of the container, the change in the volume of liquid within the container can be estimated.

As will be described, for an embodiment the contact portion includes a chain. However, the contact portion can include any form that decreases in weight as the level of the liquid changes. For an embodiment, the length of the contact portion is selected based on the depth of the container. Further, for at least some embodiments, the mass per unit length of the contact portion 130 is selected based on the physical characteristics of the float component 130. More specifically, the mass per unit length of the contact portion 130 is selected based on the desired length of the float component, and the natural force created by the float component due to the center of gravity of the float component 120 being not coincident with the center of buoyancy of the float component 120.

For at least some embodiments, the float component 120 is calibrated by measuring the tilt of the float component for various liquid levels and specific gravities (specific gravities of the liquid). Once calibrated, a look up table is referenced for liquid level determination. For various embodiments, referencing the look up table includes directly referencing the look up table, interpolating values of the look up table, and/or performing a polynomial fit on values of the look up table.

Figure 2:
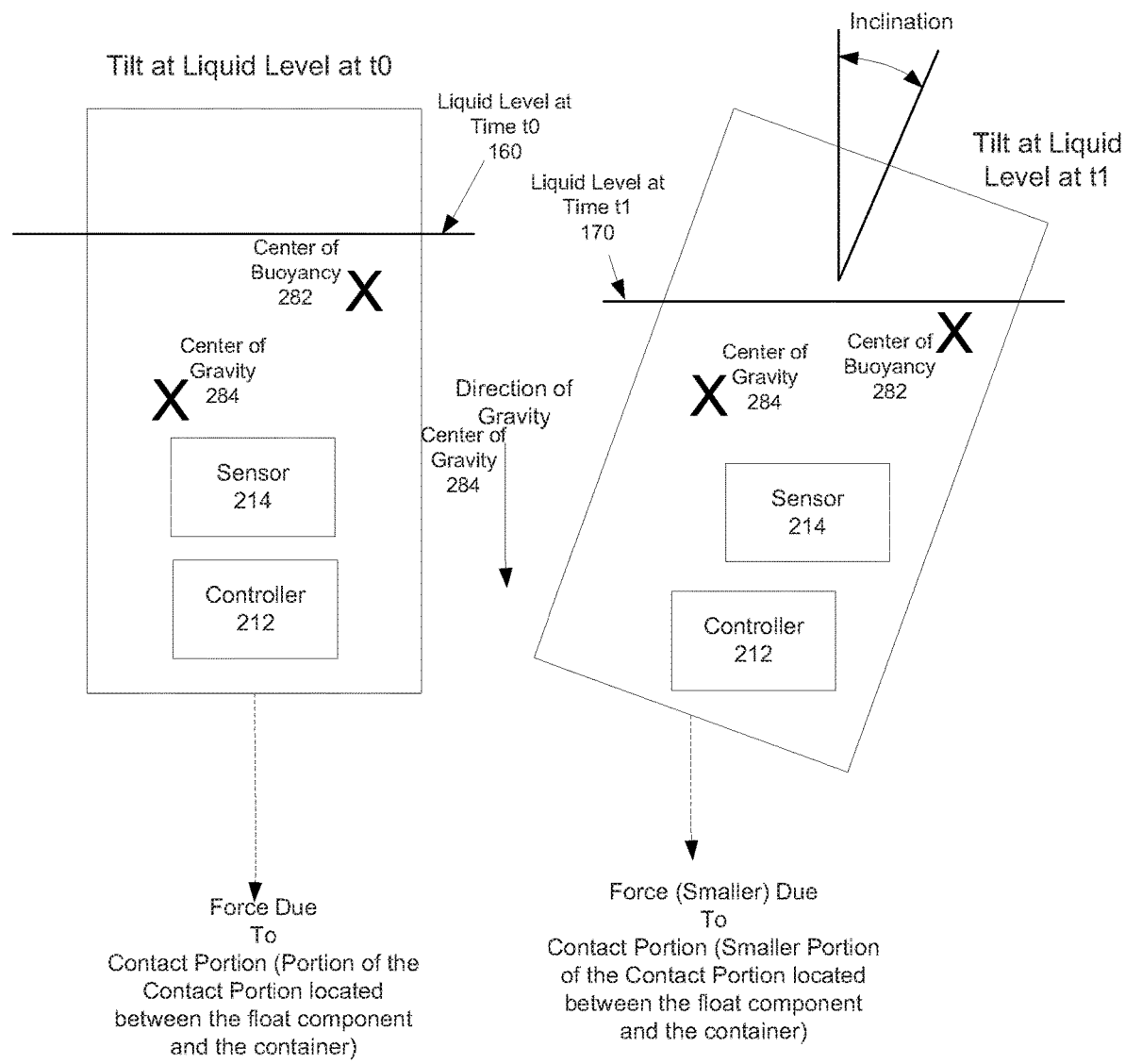
FIG. 2 shows a liquid level monitoring apparatus, according to another embodiment.

FIG. 2 shows a liquid level monitoring apparatus, according to another embodiment. For this embodiment, the float component includes a controller 212 and a sensor 214. As described, the sensor 212 senses a component that can be used to determine the inclination of the float component. For an embodiment, the sensor 212 includes an accelerometer that senses the direction of gravity. Accordingly, the sensor 212 provides a reference relative to the direction of gravity (which is assumed to be constant) which allows a determination of the inclination relative to the direction of gravity. For an embodiment, the sensor includes one or more accelerometers that that sense at least two directions of acceleration. For an embodiment, the sensor 212 includes an accelerometer that senses three (x, y, z) orientations of acceleration.

Further, the embodiment shown in FIG. 2 depicts examples of the location of the center of gravity of the float component, and the center of buoyancy of the float component. Due to the center of gravity of the float component and the center of buoyancy of the float component being non-coincident, the float component naturally tends to tilt. As indicated, as a force created by the contact component decreases, the float component tends increase its tilt (inclination).

Figure 3:
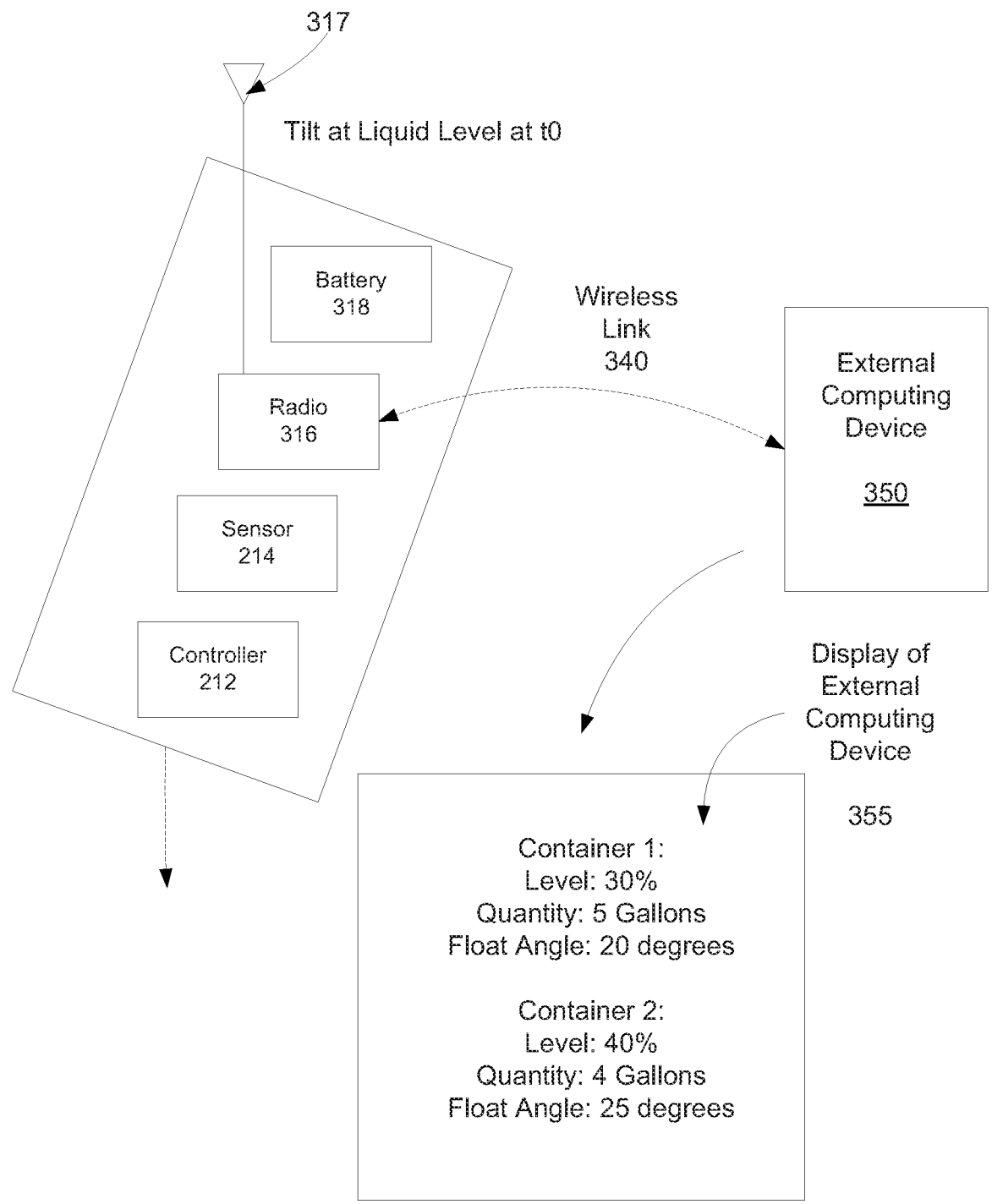
FIG. 3 shows a liquid level monitoring apparatus, according to another embodiment.

FIG. 3 shows a liquid level monitoring apparatus, according to another embodiment. The float component of FIG. 3 includes the controller 212, the sensor 214, and further includes a radio 316, and a battery 318.

For at least some embodiment, the float component communicates either the sensed direction of acceleration (gravity), or another parameter that can be used to determine the inclination of the float component, or the estimated (calculated) inclination. For at least some embodiments, the inclination information is communicated to an external computing device (such as, a cell phone) through the radio 316. However, it is to be understood that other means of communication can be used. For an embodiment, an antenna 317 is connected to the radio 316 for providing radio frequency (RF) communication with a device external to the container. For an embodiment, the antenna 317 is located at an upper portion of the float component and is located at the surface level of the liquid when measuring a liquid level.

Other embodiments that may not utilized RF communication include, for example, acoustic implementations, such as sonar, audio (for example, dual tone multi frequency (DTMF), also referred to as touch tones) and/or ultrasonic transducers. Other embodiments include magnetic communication, which may also be referred to as ultra-low frequency RF.

For at least some embodiments, the electronics (for example, the controller 212, the sensor 214, the radio 316) within the float component are power by the battery 318. Having the radio 316 and the battery 316 within the float component is very useful because the level monitoring system is fully contained within the container.

At least some embodiments include a display 355 of the external computing device depicting useful information to the user. The useful information can include, for example, monitored liquid parameters from one or more containers, wherein the information includes, for example, the liquid level, the calculated volume of the liquid, and the float or inclination angle.

Figure 4:
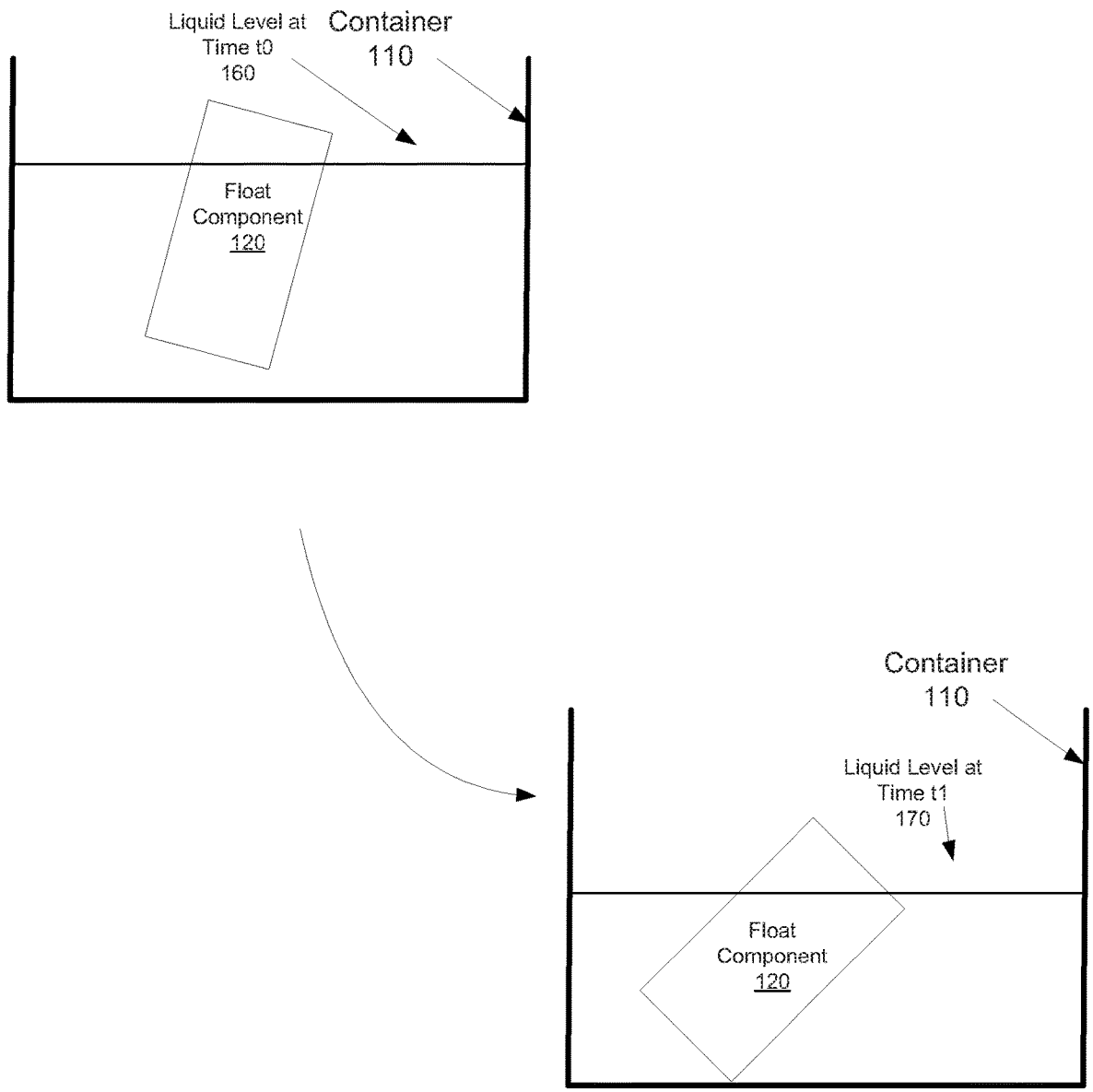
FIG. 4 shows a liquid level monitoring apparatus, according to another embodiment.

FIG. 4 shows a liquid level monitoring apparatus, according to another embodiment. As the level of the liquid changes, the float component naturally changes its inclination.

FIG. 5 is a flow chart that includes the steps of an example of monitoring a level of a liquid within a container, according to an embodiment. A first step 510 includes sensing a parameter, by a sensor of a float component of an apparatus, wherein the sensed parameter is usable to determine an inclination of the float component. A second step 520 includes receiving, by a controller of the float component, the sensed parameter. A third step 530 includes estimating the inclination of the float component based on the sensed parameter. A fourth step 540 includes determining the level of the liquid within the container based on the estimated inclination, wherein when operating to determine a level of a liquid within a container, the apparatus physically contacts the container.

Although specific embodiments have been described and illustrated, the embodiments are not to be limited to the specific forms or arrangements of parts so described and illustrated. The embodiments are limited only by the appended claims.

What is claimed:
1. An apparatus, comprising:
   a float component, the float component comprising:
      a sensor, wherein the sensor senses a parameter usable to determine an inclination of the float component;
      a controller, wherein the controller is operable to:
         receive the sensed parameter; and
         communicate information based on the sensed parameter to an external controller;
   wherein when operating to determine a level of a liquid within a container, the apparatus physically contacts the container;
   wherein at least one of the controller or the external controller is operative to:
estimate the inclination of the float component based on the sensed parameter; and
determine the level of the liquid within the container based on the estimated inclination;
      wherein the apparatus further comprises a contact portion, wherein the contact portion is connected to the float component, and wherein when the apparatus is operating to determine the level of the liquid within the container, the contact portion physically contacts the container;

wherein a center of buoyancy of the float component and a center of gravity of the float component are not coincident; and wherein the contact portion has a mass and a mass per unit length, and a portion of the contact portion located between the float component and container changes as the level of the liquid within the container changes.

2. The apparatus of claim 1, wherein the contact portion comprises a chain connected to the float component, and a mass and mass per unit length of the chain allows for detection of changes of the inclination of the float component.

3. The apparatus of claim 2, wherein the parameter is sensed when a force upon the float component due to a mass of the portion of the chain located between the float component and the container is equal to a force created by the float component due to the center of mass of the float component and a center of gravity of the float component not being coincident.

4. The apparatus of claim 3, wherein a length of the chain ensures that when the apparatus is operating to determine the level of the liquid within the container, the chain physically contacts the container.

5. The apparatus of claim 1, wherein the sensor comprises an accelerometer, and sensed acceleration is used to determine the inclination of the float component.

6. The apparatus of claim 5, wherein information communicated from the controller to the external controller includes the sensed acceleration.

7. The apparatus of claim 5, wherein information communicated from the controller to the external controller includes the determined level of the liquid within the container.

8. The apparatus of claim 1, further comprising a radio, and wherein the controller communicates with the external controller through the radio.

9. The apparatus of claim 8, wherein an antenna of the radio is located on the apparatus where the apparatus is above the liquid when operating to determine the level of the liquid within the container.

10. The apparatus of claim 1, further comprising a battery, and wherein the battery powers electronics within the apparatus.

11. A method, comprising:
sensing a parameter, by a sensor of a float component of an apparatus, wherein the sensed parameter is usable to determine an inclination of the float component;
receiving, by a controller of the float component, the sensed parameter;
estimating the inclination of the float component based on the sensed parameter;
determining the level of the liquid within the container based on the estimated inclination;

wherein when operating to determine a level of a liquid within a container, the apparatus physically contacts the container;

wherein for determining the level of the liquid within the container a contact portion of the apparatus physically contacts the container, wherein the contact portion is connected to the float component;

wherein a center of buoyancy of the float component and a center of gravity of the float component are not coincident; and wherein the contact portion has a mass and a mass per unit length, and a portion of the contact portion located between the float component and container changes as the level of the liquid within the container changes.

12. The method of claim 11, wherein the contact portion comprises a chain connected to the float component, and a mass and mass per unit length of the chain allows for detection of changes of the inclination of the float component.

13. The method of claim 12, wherein the parameter is sensed when a force upon the float component due to a mass of the portion of the chain located between the float component and the container is equal to a force created by the float component due to the center of mass of the float component and a center of gravity of the float component not being coincident.

14. An apparatus, comprising:
a float component, the float component comprising:
a sensor, wherein the sensor senses a parameter for determining an inclination of the float component;
a controller, wherein the controller operates to:
receive the sensed parameter; and
communicate information based on the sensed parameter to an external controller;
wherein at least one of the controller or the external controller operates to:
determine a level of a liquid within a container, comprising:
estimating the inclination of the float component based on the sensed parameter; and
determining the level of the liquid within the container based on the estimated inclination;
wherein the apparatus further comprises a contact portion, wherein the contact portion is connected to the float component, and wherein when the apparatus is operating to determine the level of the liquid within the container, the contact portion physically contacts the container;
wherein a center of buoyancy of the float component and a center of gravity of the float component are not coincident; and
wherein the contact portion has a mass and a mass per unit length, and a portion of the contact portion located between the float component and container changes as the level of the liquid within the container changes.

* * * * *